United States Patent
Barlev et al.

(12)

(10) Patent No.: US 10,691,475 B2
(45) Date of Patent: *Jun. 23, 2020

(54) SECURITY APPLICATION FOR A GUEST OPERATING SYSTEM IN A VIRTUAL COMPUTING ENVIRONMENT

(71) Applicant: International Business Machines Corporation, Armonk, NY (US)

(72) Inventors: Shai Barlev, Rehovot (IL); Shahar Kohanim, Rehovot (IL); Shmulik Regev, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/102,927

(22) Filed: Aug. 14, 2018

(65) Prior Publication Data

US 2019/0004833 A1 Jan. 3, 2019

Related U.S. Application Data

(63) Continuation of application No. 14/986,533, filed on Dec. 31, 2015, now Pat. No. 10,089,124.

(51) Int. Cl.
*G06F 9/455* (2018.01)
*G06F 11/30* (2006.01)
*G06F 9/54* (2006.01)

(52) U.S. Cl.
CPC .......... *G06F 9/455* (2013.01); *G06F 9/4555* (2013.01); *G06F 9/45533* (2013.01); *G06F 9/45558* (2013.01); *G06F 9/545* (2013.01); *G06F 9/546* (2013.01); *G06F 11/30* (2013.01); *G06F 11/301* (2013.01); *G06F 11/3055* (2013.01);
(Continued)

(58) Field of Classification Search
CPC .. G06F 9/455; G06F 9/45533; G06F 9/45558; G06F 2009/45587; G06F 2009/45591; G06F 11/30; G06F 11/301; G06F 11/3055
See application file for complete search history.

(56) References Cited

U.S. PATENT DOCUMENTS

| 8,234,697 | B2 | 7/2012 | Chhabra |
| 8,832,352 | B2 | 9/2014 | Tsirkin et al. |
| 8,910,155 | B1 | 12/2014 | Sobel et al. |

(Continued)

OTHER PUBLICATIONS

Chiueh et al, "Stealthy Deployment and Execution of In-Guest Kernel Agents", In BlackHat, 2009, pp. 1-12 plus cover (Year: 2009).*

(Continued)

*Primary Examiner* — Charles M Swift

(57) ABSTRACT

Hypervisors and guest operating systems/virtual machines communicate in virtual environments to enable applications and other services. Security measures are a concern in implementing a secure environment. One feature may include at least one of identifying a session initiation request from a guest operation system at a hypervisor component of a server and receiving periodic messages from the guest operating system, and establishing and maintaining a session and connection between the hypervisor and the guest operating system responsive to receiving the periodic messages from the guest operating system.

22 Claims, 10 Drawing Sheets

(52) U.S. Cl.
CPC .............. *G06F 2009/45587* (2013.01); *G06F 2009/45591* (2013.01)

(56) References Cited

U.S. PATENT DOCUMENTS

| | | | |
|---|---|---|---|
| 9,117,080 | B2 | 8/2015 | Lukacs et al. |
| 2009/0217021 | A1 | 8/2009 | Goodson et al. |
| 2009/0328030 | A1 | 12/2009 | Fries |
| 2010/0188975 | A1* | 7/2010 | Raleigh ................ G06Q 40/00 370/230.1 |
| 2010/0211829 | A1 | 8/2010 | Ziskind et al. |
| 2010/0318991 | A1 | 12/2010 | Venkitachalam et al. |
| 2011/0107331 | A1 | 5/2011 | Evans et al. |
| 2011/0252224 | A1 | 10/2011 | Chandrasekhara et al. |
| 2011/0307888 | A1 | 12/2011 | Raj et al. |
| 2012/0278801 | A1 | 11/2012 | Nelson et al. |
| 2013/0275966 | A1 | 10/2013 | Harper et al. |
| 2013/0290542 | A1 | 10/2013 | Watt et al. |
| 2013/0290694 | A1* | 10/2013 | Civilini ............... H04L 41/0806 713/2 |
| 2014/0181892 | A1 | 6/2014 | Von Bokem et al. |
| 2014/0372788 | A1 | 12/2014 | Vavrick et al. |
| 2015/0154046 | A1 | 6/2015 | Farkas et al. |
| 2015/0199513 | A1 | 7/2015 | Ismael et al. |
| 2015/0199531 | A1 | 7/2015 | Ismael et al. |
| 2015/0199532 | A1 | 7/2015 | Ismael et al. |
| 2015/0324216 | A1 | 11/2015 | Sizemore et al. |
| 2016/0127509 | A1 | 5/2016 | Uriel |
| 2016/0210208 | A1 | 7/2016 | Chen |
| 2016/0371110 | A1 | 12/2016 | Radhakrishnan |
| 2017/0124326 | A1 | 5/2017 | Wailly et al. |

OTHER PUBLICATIONS

Chiueh et al., "Surreptitious Deployment and Execution of Kernel Agents in Windows Guests", 2012, IEEE, pp. 507-514.
Lee et al., "A Pre-Kernel Agent Platform for Security Assurance", 2011, IEEE, pp. 1-7.

* cited by examiner

SECURITY APPLICATION FOR A GUEST OPERATING SYSTEM IN A VIRTUAL COMPUTING ENVIRONMENT

TECHNICAL FIELD

This application relates to security in a virtual computing environment, and more particularly, to enabling guest operating systems to operate a security platform application while accessing a virtual computing environment.

BACKGROUND

Security tools are often hacked by malicious software operating on an infected computing device. An attacker may try to uninstall the security tool, bypass its protection mechanisms, or render it useless by removing portions of its required resources. In order to reduce the likelihood of such attacks, security tools may be utilized which include a protecting kernel resident module that guarantees the device integrity as well as the integrity of the system resources being utilized. However, an attacker who gained sufficient privileges (i.e., root or administrative depending on the operating system) can attack kernel modules as well.

Various security APIs implement a security channel to enable a 'security virtual machine', however, this approach does not provide protection against certain attacks, such as with respect to a guest virtual machine (VM). Also, hypervisor components are generally not included to assure protection of the guest VMs.

Certain previous approaches to implementing security measures include a number of guest OSs operating on one or more hypervisors. Such approaches focus on detecting errors in the running guest OSs, deciding whether the fault is local to a single OS or to others and selecting corrective actions accordingly. Such actions may include a restart of a single OS or a migration to a different hypervisor if the errors are reported from two or more guests, thus pointing to a fundamental problem (i.e. not local to a single OS).

Other approaches include a distributed and coordinated security system providing intrusion detection and prevention for virtual machines (VMs) operating in a virtual server. This may include passing a packet stream through an associated networking driver of a virtualization platform and filtering the packet stream in a security platform of the guest virtual machine. However, this approach fails to identify an attack on the guest OS or vulnerabilities exploited through legitimate traffic. The approaches to detecting removal of security agents operating on guest operating systems are limited in scope and could be potentially overcome by attackers seeking access to virtual resources.

SUMMARY

Hypervisors and guest operating systems/virtual machines communicate in virtual environments to enable applications and other services. Security measures are always a concern in implementing a secure environment. One example may include identifying a session initiation request from a guest operation system at a hypervisor component of a server. Also, the example may include receiving periodic messages from the guest operating system, and establishing and maintaining a session and connection between the hypervisor and the guest operating system responsive to receiving the periodic messages from the guest operating system.

Another example embodiment of the present application may include an apparatus that provides a processor configured to perform at least one of identify a session initiation request from a guest kernel module at a hypervisor component of a server, and initialize a session between the guest kernel module and the hypervisor component. Also, a receiver configured to receive periodic messages from the guest kernel module, and where the processor is further configured to maintain the session between the hypervisor component and the guest kernel module responsive to the periodic messages received from the guest kernel module.

Another example embodiment may include a non-transitory computer readable storage medium configured to store instructions that when executed cause a processor to perform at least one of identifying a session initiation request from a guest kernel module at a hypervisor component of a server, initializing a session between the guest kernel module and the hypervisor component, receiving periodic messages from the guest kernel module, and maintaining the session between the hypervisor component and the guest kernel module responsive to receiving the periodic messages from the guest kernel module.

DETAILED DESCRIPTION

Figure 1:
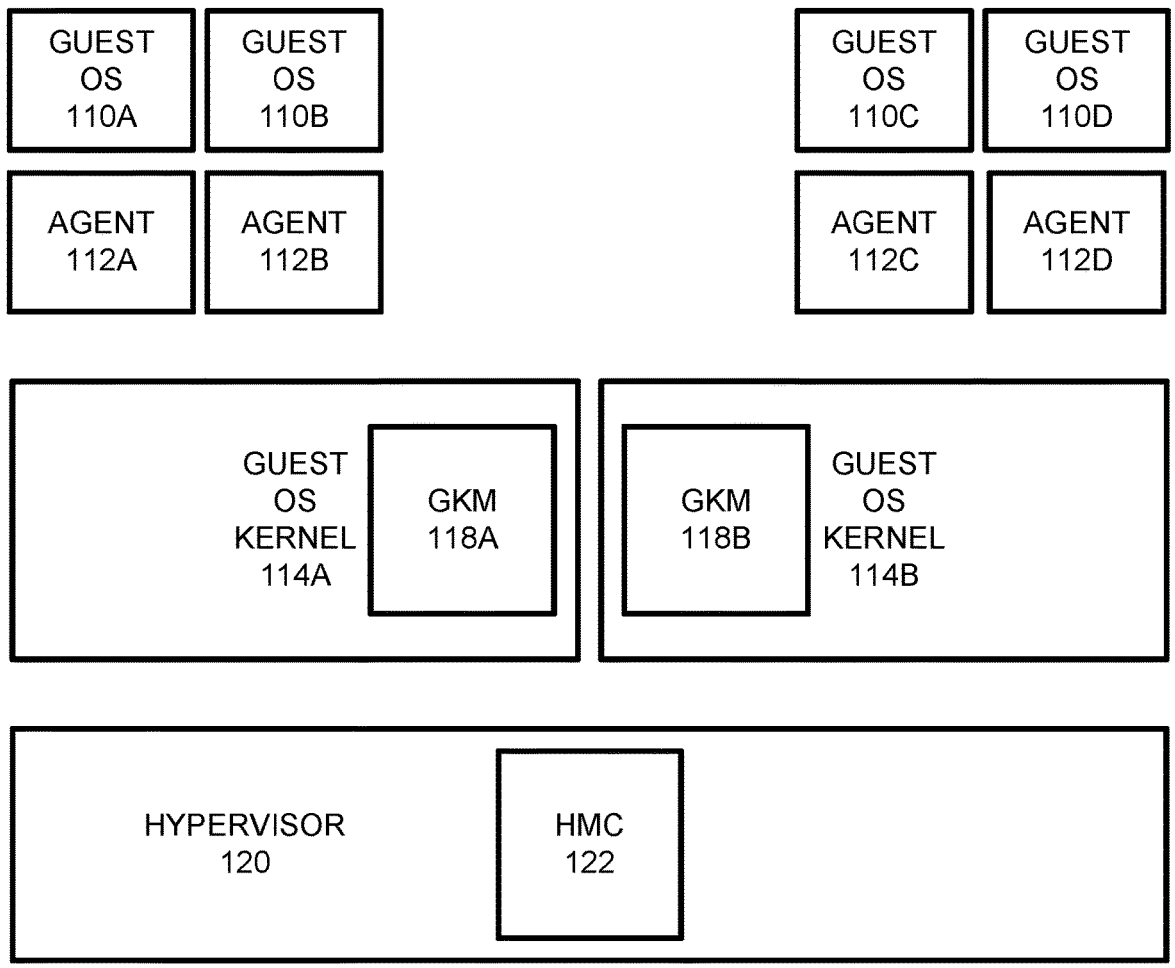
FIG. 1 illustrates a configuration diagram of a virtual environment according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling. In addition, the communication between the hypervisor(s), guest operating systems, guest kernel module(s) (GKM) and/or the hypervisor management components(s) (HMC) may include direct and/or indirect information sharing via a shared memory or other information sharing mechanism.

Example embodiments provide hypervisor and virtual machine guest operating system (OS) configurations with tamper detection for guest protection. An attack on a machine may be discovered through a sudden disconnect of a cryptographic heartbeat communication protocol. In operation, the heartbeat messages may suddenly stop being sent from the guest OS and received via the hypervisor due to removal of the guest kernel module (GKM). In such a scenario, when the GKM is completely removed it cannot report any kind of error voluntarily. Therefore, the heartbeat message detection and lack thereof serves to maintain integrity between a hypervisor and guest OS configuration.

Components of the hypervisor and the kernel modules in the guest OS will indicate whether there are additional components added by the hypervisor. Additionally, listing those components and communication channels between the hypervisor and the guest OS will indicate whether such communication between those entities is active. The hypervisor component is distinct from the guest OS infrastructure and may detect tampering of the guest OS security components and enforce any applicable anti-tampering protection policy.

FIG. 1 illustrates a virtual network diagram with various virtual components according to example embodiments. Referring to FIG. 1, a virtual configuration 100 includes a hypervisor 120 as a fundamental virtual environment component which further includes a hypervisor management component (HMC) 122. Another layer includes the guest operating system (OS) kernel 114A and 114B where a guest virtual machine can be identified and authenticated by the hypervisor 120. The guest OSs 114A and/or 114B may receive a request to install guest kernel modules 118A and 118B, respectively, which include heartbeat protocol criteria including but not limited to the heartbeat message requirements (i.e., packet size) and/or specified frequency criteria (i.e., heartbeat message specifications and number per time interval). A guest OS user space 110A, 110B, 110C, 110D, etc., may then install an agent 112A, 112B, 112C and/or 112D as directed by the hypervisor so the heartbeat criteria can be established to begin updating the hypervisor 120 based on the frequency requirements, which may include one message per a specified time interval. The installation of the agent may be performed by the hypervisor by initiating the guest OS with the agent upon boot-up. Each instance of the guest OS may have its own agent.

The heartbeat protocol criteria may include a cryptographic heartbeat which is also provided when the guest OS 114A, for example, begins to boot-up and is detected by the hypervisor 120. A guest kernel module (GKM) 118A, for example, is then installed and is provided with a randomly generated secret key for communication with the HMC 122. The GKM 118A stores the key securely in its private memory and obfuscates its location. The HMC 122 and the GKM 118A communicate using a hypervisor provided communication mechanism such as event channels. Messages over the channel(s) are encrypted with an authenticated encryption protocol using the shared key provided at boot-up. The encryption protocol provides at least one of confidentiality, integrity, authenticity and a replay protection. The GKM 118A uses the encrypted channel to send security events to the HMC 122. The GKM 118A periodically sends a heartbeat message over the encrypted channel according to a predetermined schedule. In one embodiment, the schedule can be set at any time. If the HMC 122 notices that the GKM 118A stops sending heartbeats it can react by either attempting to revive the activity via the OS and/or alert a designated administrator and/or one or more computers (which include a processor and memory) in a network accessible by the administrator of a possible attack by the guest OS 114A.

The information shared between virtual components of the virtual system may reside in shared memory spaces and other shared information locations which could be used to communicate between guest operating systems, hypervisors and other virtual system components. For example, XEN communication standards could be used to exchange data, which could be a 1-bit flag or pointer, to identify information stored in the shared memory spaces including but not limited to security threats alerts and heartbeat messages. The event channel may be the basis for utilizing 1-bit information sharing between virtual elements of the virtual environment.

Hypervisors can be used to ease the deployment and management of servers and workstations. As a hypervisor operates at a lower layer than a guest OS's kernel, an adversary executing in the context of a guest OS cannot affect the hypervisor. As a result, a security or protection tool that is assisted by hypervisor resident code is shielded from such attacks. A hypervisor resident component may be used for installing the protection tool within compatible guest OSs as well as processing output and guaranteeing normal operations. The security tool may be split into two components, executing at different layers with one component operating in the hypervisor which is safe but independent of the guest OS (i.e., processes, memory, file systems). The other component operates in the guest OS, which is more vulnerable but has visibility into the OS. The hypervisor 120 injects the guest OS component into the guest OS to mitigate attacks within the guest OS, which tries to remove security tools that can interfere with the attack's progress. For example, when the guest OS 114A boots, the GKM 118A is added. The HMC 122 and the GKM 118A use a communication mechanism, such as event channels, through which regular, signed, heartbeat messages are sent and received. The communication protocol guarantees authenticity and resiliency. If the HMC 122 notices that the GKM 118A stops sending heartbeats, it can respond by either reviving the guest in an OS specific manner and/or alerting the administrator as this inaction can be an indication of a malicious attack.

Figure 2A:
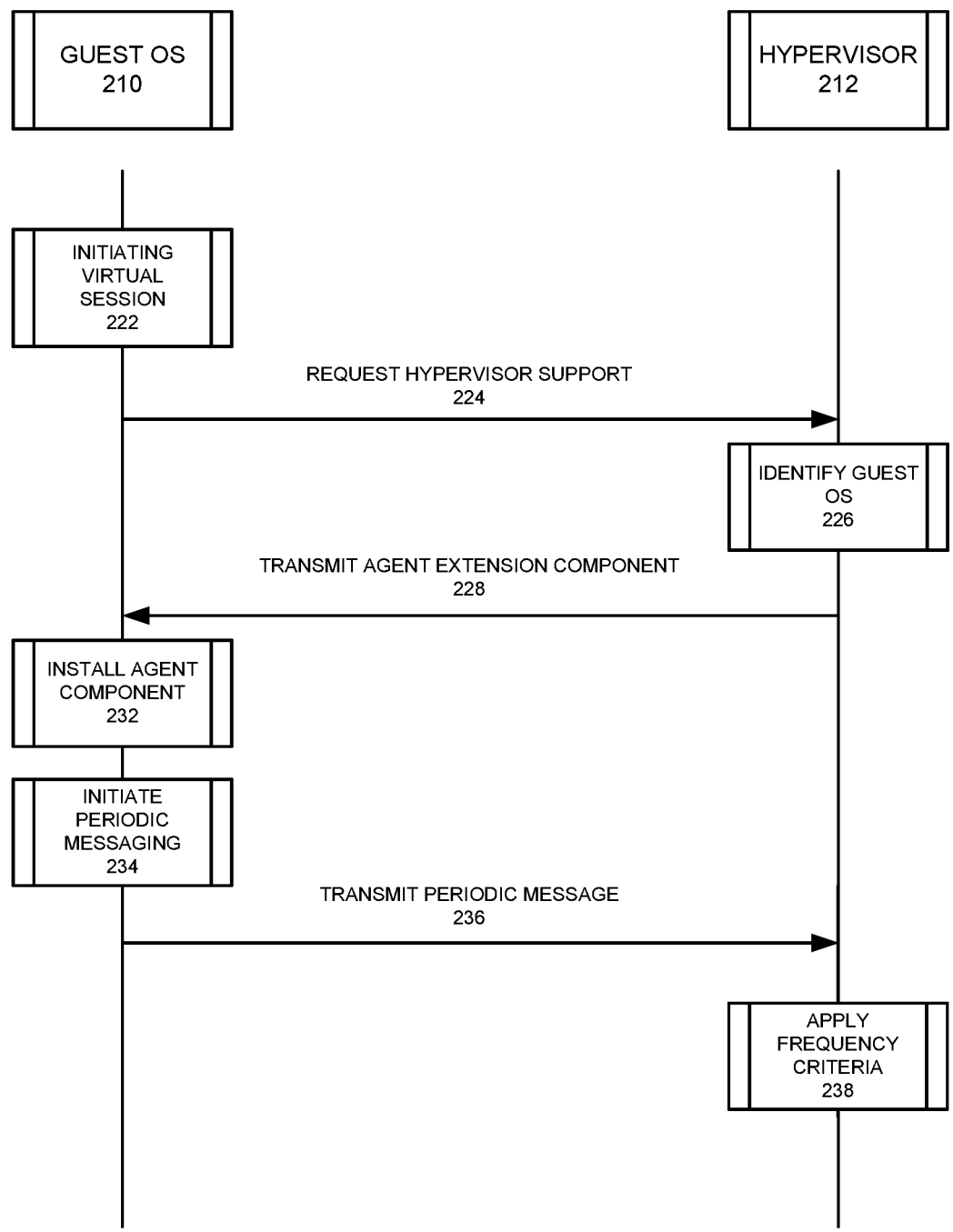
FIG. 2A illustrates a system communication diagram of a data communication between a guest operating system and a hypervisor according to an example embodiment of the present application.

FIG. 2A illustrates a system configuration diagram 200 of a security communication session between a guest OS 210 and a hypervisor 212 according to example embodiments. Referring to FIG. 2A, the guest OS 210 may initiate communication via a virtual session setup operation 222. The hypervisor 212 may receive a request to communicate 224 from the guest OS 210 and may respond by identifying 226 the guest OS via predefined credentials stored in memory identifying the guest OS 210. An agent extension component 228 may then be forwarded to the guest OS 210 for installation 232. The guest OS 210 may then be required to submit periodic heartbeat messages 236 during an active session with the hypervisor 212. The hypervisor 212 will receive the heartbeat messages and apply predetermined frequency criteria 238 to ensure the messages are received in the correct time frame.

During a virtual environment setup/configuration, the guest OS 110A/210 communicates with the hypervisor 120/212, and the guest OS 110A boots a guest kernel module (GKM), which is installed by the HMC 122. Following the installation, the GKM 118A receives a randomly generated secret shared key for communication with the HMC 122. The GKM 118A stores the key in its private memory and obfuscates the location to reduce the likelihood of unwarranted access. The HMC 122 and GKM 118A communicate using a hypervisor 120 provided communication mechanism, such as a XEN event channel. All messages over the channel are encrypted with an authenticated encryption protocol using the shared key provided at boot-up of the guest OS 110. The encryption protocol provides confidentiality, integrity, authenticity and replay protection. The GKM 118A uses the encrypted channel to transmit (security) events to the HMC 122. Also, the GKM 118A periodically transmits a heartbeat message over the encrypted channel.

Figure 2B:
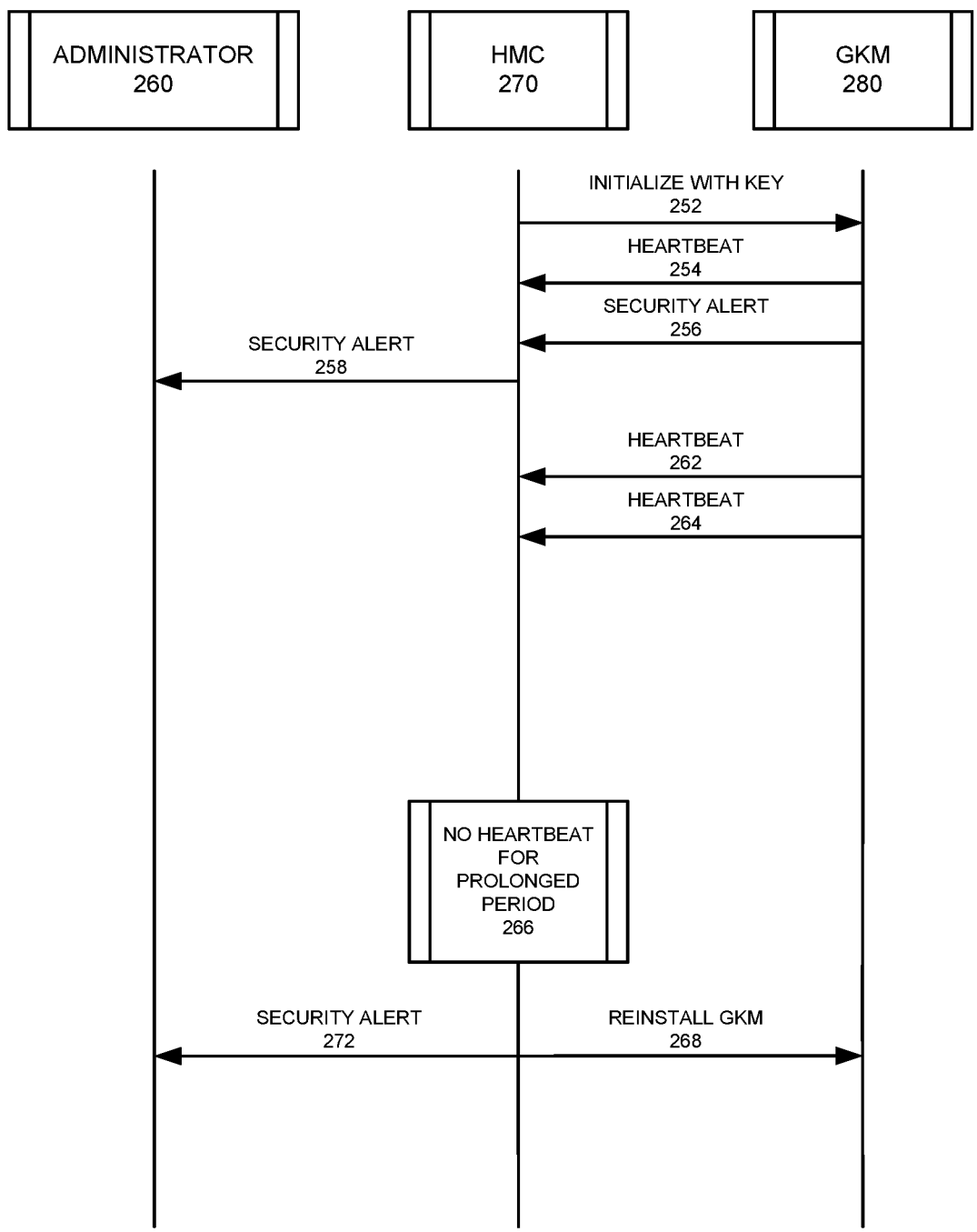
FIG. 2B illustrates a system communication diagram of a data communication between an administrator and a hypervisor management component and guest kernel module according to an example embodiment of the present application.

FIG. 2B illustrates a system communication diagram of a data communication between an administrator and a hypervisor management component and guest kernel module according to an example embodiment of the present application. Referring to FIG. 2B, in this communication configuration the administrator 260 receives alerts when the communication between the HMC 270 and the GKM 280 falters or more specifically fails to maintain a periodic heartbeat communication. In operation, the HMC 270 will initialize the communication with the GKM 280 with a key 252. The key can be used to encrypt various communication messages shared between the GKM 280 and the HMC 270. Thereafter, the heartbeat messages 254 may begin and continue per the agreed heartbeat protocol standard of sending and receiving of regular heartbeat messages. A security alert may be created and transmitted by the HMC 270 at any time to indicate whether there are any security threats present based on various security management criteria, such as unexpected actions, prolonged periods of time when no heartbeat messages are received, etc. In one example, a security alert 256 may be forwarded and/or created by the HMC 270, which forwards the security alert 258 to the administrator 260 for any reason related to a potential security threat. The GKM 280 may begin transmitting heartbeat messages 262, 264, in succession at a predetermined frequency interval (i.e., every 30 seconds, 1 minute, 5 minutes, etc.). The absence of heartbeat messages after a predetermined period of time 266 may be detected by the HMC 270. When the HMC 270 identifies that the GKM 280 stopped sending heartbeats the HMC 270 may response by either attempting to revive the GKM 280 via an OS specific command and/or alerting the administrator device 260 of a possible attack on the guest. In this example, the HMC 270 may attempt to reinstall the GKM 268. The security alert 272 indicating the absence of heartbeats may then be sent to the administrator 260 to relay the absence of the heartbeats and the potential security threat.

A heartbeat(s) may be identified as a set of messages between two or more network elements that are repeatedly sent in order to guarantee that the connection is open and confirmed and that the sending party is still functioning. Any "cryptographic" message is signed using a pre-shared key by the sending party, and this may reduce $3^{rd}$ parties from forging the messages. The signed content includes a timestamp to prevent replay attacks. The shared key between the guest OS 210 and the hypervisor 212 may be based on any known form of encryption. The security events may be any type of event the GKM 280 considers as bearing some security related significance. For example, launching new processes, opening new connections, editing certain files, etc., may all be considered elevated security risks which require an audit of active security. The guest OS 210 will send heartbeat messages throughout the time of boot-up until shutdown. This ensures that the GKM code is running.

The operations of the instant application may be performed by checking an encrypted element in a host virtual environment by a native operating system (hypervisor) by installing a protected guest operating system component extension during booting of a virtual environment by the native operating system (OS) hypervisor. The protected extension issues a signed heartbeat message periodically via a secure protocol. The hypervisor may monitor the signed heartbeat message by a native OS according to a frequency criteria (e.g., after a certain number of seconds, minutes, hours, etc.), and responsive to detecting an absence of the signed heartbeat message within the frequency criteria, a first action may be performed by the native OS to facilitate avoidance of nefarious activity such as tampering in the virtual environment. Results and actions may include providing a notification, terminating the virtual environment, and rebooting the guest operating system with a replaced protected extension. Also, an application monitoring process in the virtual environment may be provided for validating integrity of the protected extension and integrity of the virtual environment, and responsive to detecting a corruption of the protected extension, a second action may be performed to reduce effects of the corruption. The virtual environment could be a virtual machine (VM), a logical partition (LPAR), and/or a work load partition (WPAR).

Figure 3:
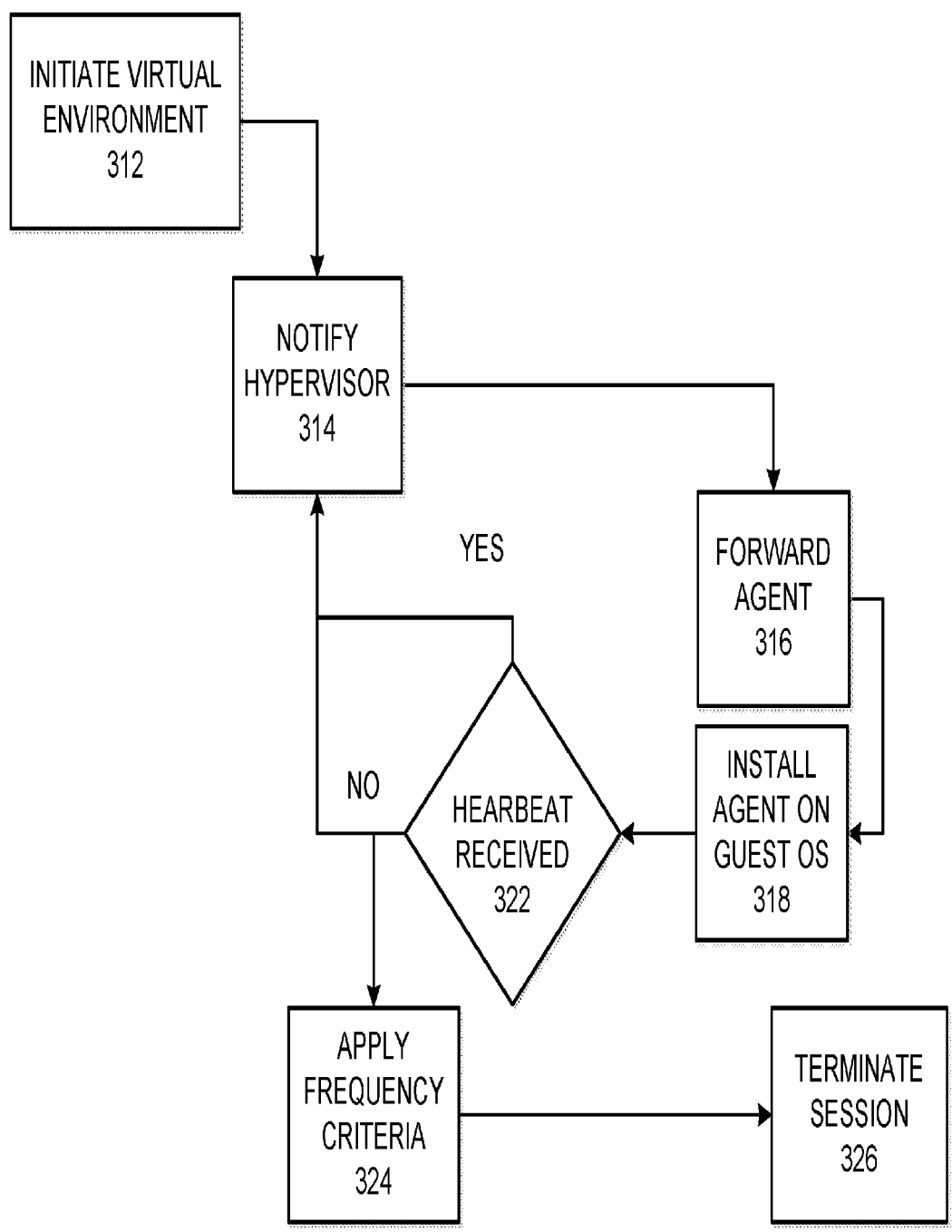
FIG. 3 illustrates a logic flow diagram of a security procedure within the virtual environment according to an example embodiment of the present application.

FIG. 3 illustrates a logic diagram 300 of at least one operation included in a guest OS setup and compliance function in a virtual environment. Referring to FIG. 3, an initial virtual environment setup operation 312 invokes a hypervisor notification operation 314 to request a session via a communication channel. The hypervisor may then forward the agent 316 a plug-in agent which is installed/setup 318 so heartbeat messages may begin updating the hypervisor of the guest OS status. The heartbeat is received 322 and the hypervisor is notified. Also, the hypervisor is notified in the event of the heartbeat message not being received. In this case, the frequency criteria 324 will be identified to ensure the heartbeat was supposed to be received. As a result, in one embodiment, the session is terminated 326 to protect the virtual environment form a non-compliant guest OS.

Figure 4:
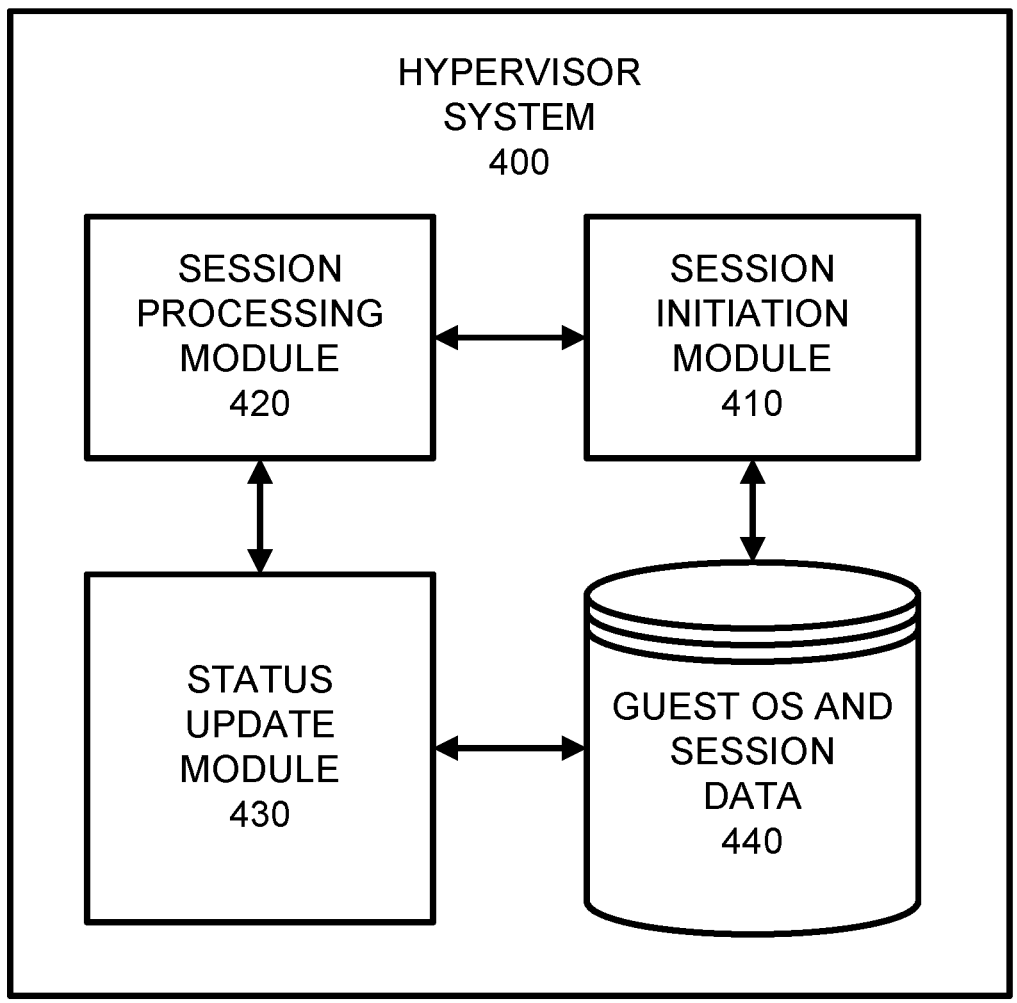
FIG. 4 illustrates a system configuration configured to perform one or more of the example embodiments of the present application.

FIG. 4 illustrates a hypervisor system 400 configured to perform one or more of the steps described or depicted herein. Referring to FIG. 4, the hypervisor system 400 may be a single computer (such as a server), other device (that includes a processor and memory) or multiple computers or devices which support the operation of the security measures of the virtual environment. The system 400 includes a session initiation module 410 which receives a guest OS invite or request to enter a virtual session. A session processing module 420 may receive the request and prepare a response that includes an agent module being sent to the guest OS for installation. The session processing module may also process heartbeat messages received to validate the responses accordingly. A status update module 430 may ensure the heartbeat criteria is maintained accordingly and may store and update records of the guest OS and the session in a databank 440.

One example method of operation performed by the hypervisor system 400 may include identifying a session initiation request at the session initiation module 410 from a guest kernel module at a hypervisor component of a server and initializing a session between the guest kernel module and the hypervisor component via the session processing module 420. The method may also provide receiving periodic messages from the guest kernel module, and maintaining the session between the hypervisor component and the guest kernel module responsive to receiving the periodic messages from the guest operating system via the status update module 430. The update module 430 may also perform transmitting an agent application to the guest operating system responsive to receiving the session initiation request. All information pertaining to the session may be stored in the databank 440.

In one example, the hypervisor component of the server is the hypervisor management component (HMC). The system 400 may further provide determining a prolonged period of no periodic messages received, and notifying an administrator device of a potential security alert. As a result, the guest kernel module may be reinstalled responsive to determining the prolonged period of no periodic messages received. The periodic messages received from the guest kernel module are heartbeat messages which are periodically transmitted from the guest kernel module to the hypervisor component according to a predetermined time interval. The interval may be based on frequency criteria applied to the heartbeat message as specified by the HKM.

The steps described or depicted in connection with the embodiments disclosed herein may be embodied directly in hardware, firmware, in a computer program executed by a processor, or in one or more of the above. A computer program may be embodied on a non-transitory computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Such a storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components, etc.

Figure 5:
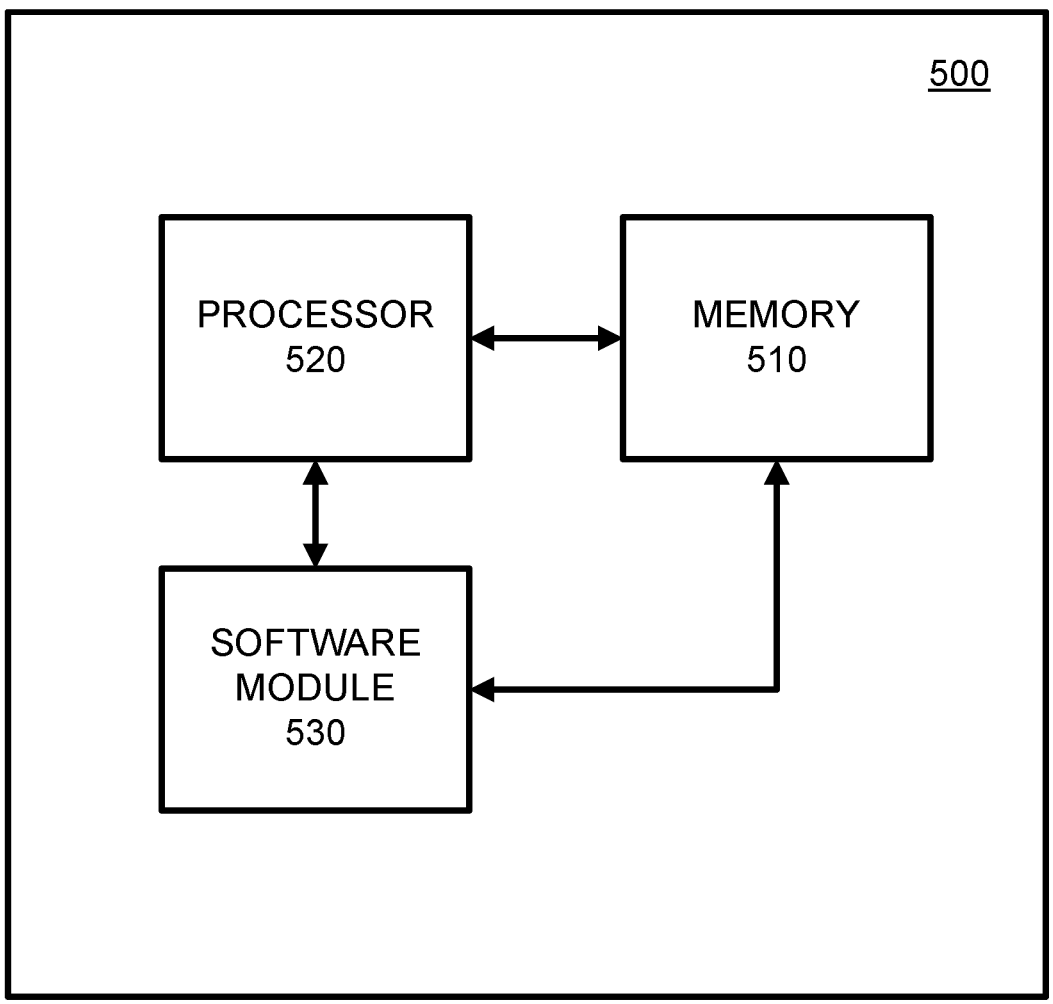
FIG. 5 illustrates an example network entity device configured to store instructions, software, and corresponding hardware for executing the same, according to example embodiments of the present application.

As illustrated in FIG. 5, a memory 510 and a processor 520 may be discrete components of the network entity 500 that are used to execute an application or set of operations or steps as described or depicted herein. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, a receiver or both. For example, all or part of the functionality performed by the individual components or modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

Figure 6:
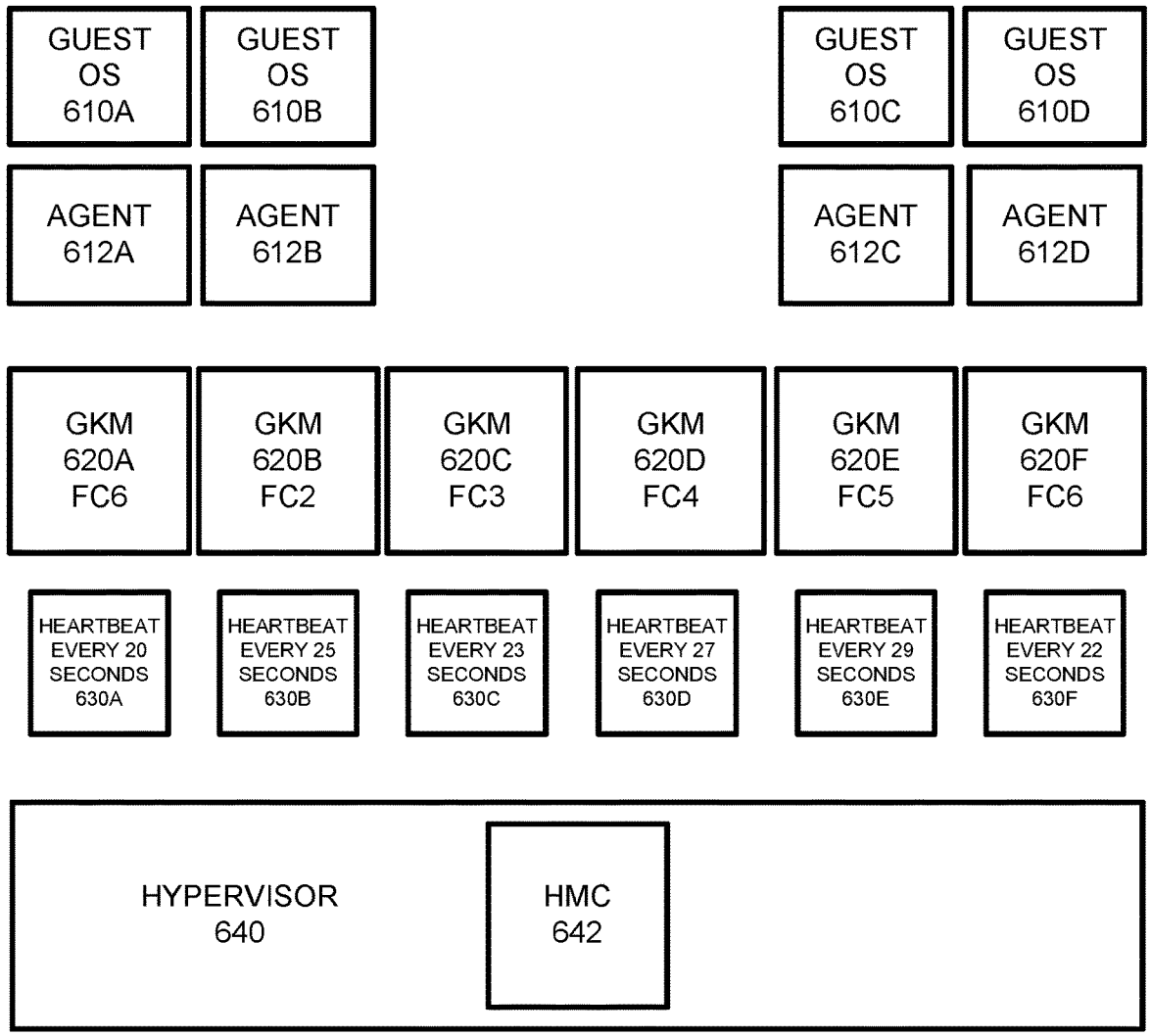
FIG. 6 illustrates another example configuration diagram of a virtual environment for multiple heartbeat requirements being assigned according to another example embodiment of the present application.

FIG. 6 illustrates another example configuration diagram of a virtual environment for multiple heartbeat requirements being assigned according to another example embodiment of the present application. Referring to FIG. 6, the configuration 600 includes agents 612A, 612B, 612C and 612D which may be managed by the hypervisor 640 via the hypervisor management component (HMC) 642 to setup the guest kernel modules (GKMs) 620A, 620B, 620C, 620D, 620E and 620F to provide different heartbeat criteria messaging to the hypervisor 640 according to customized heartbeat criteria (HBC). Also, each guest OS 610A, 610B, 610C and 610D may have its own assigned respective agent. Additionally, the first GKM 620A may have a heartbeat requirement of every 20 seconds 630A, the next GKM 620B may be instructed to provide heartbeats every 25 seconds 630B, while the GKM 620C is required to provide heartbeats every 23 seconds 630C, and the GKM 620D is required to provide heartbeats every 27 seconds 630D and the GKM 620E is required to provide heartbeats every 29 seconds 630E and lastly the GKM 620F is required to provide heartbeats every 22 seconds. The criteria is unique for each GKM and may be randomly assigned by the HMC 642. The HBC is stored in a profile for each GKM so large groups of assignments can be organized and maintained for a growing capacity of GKMs in a virtual environment.

Figure 7:
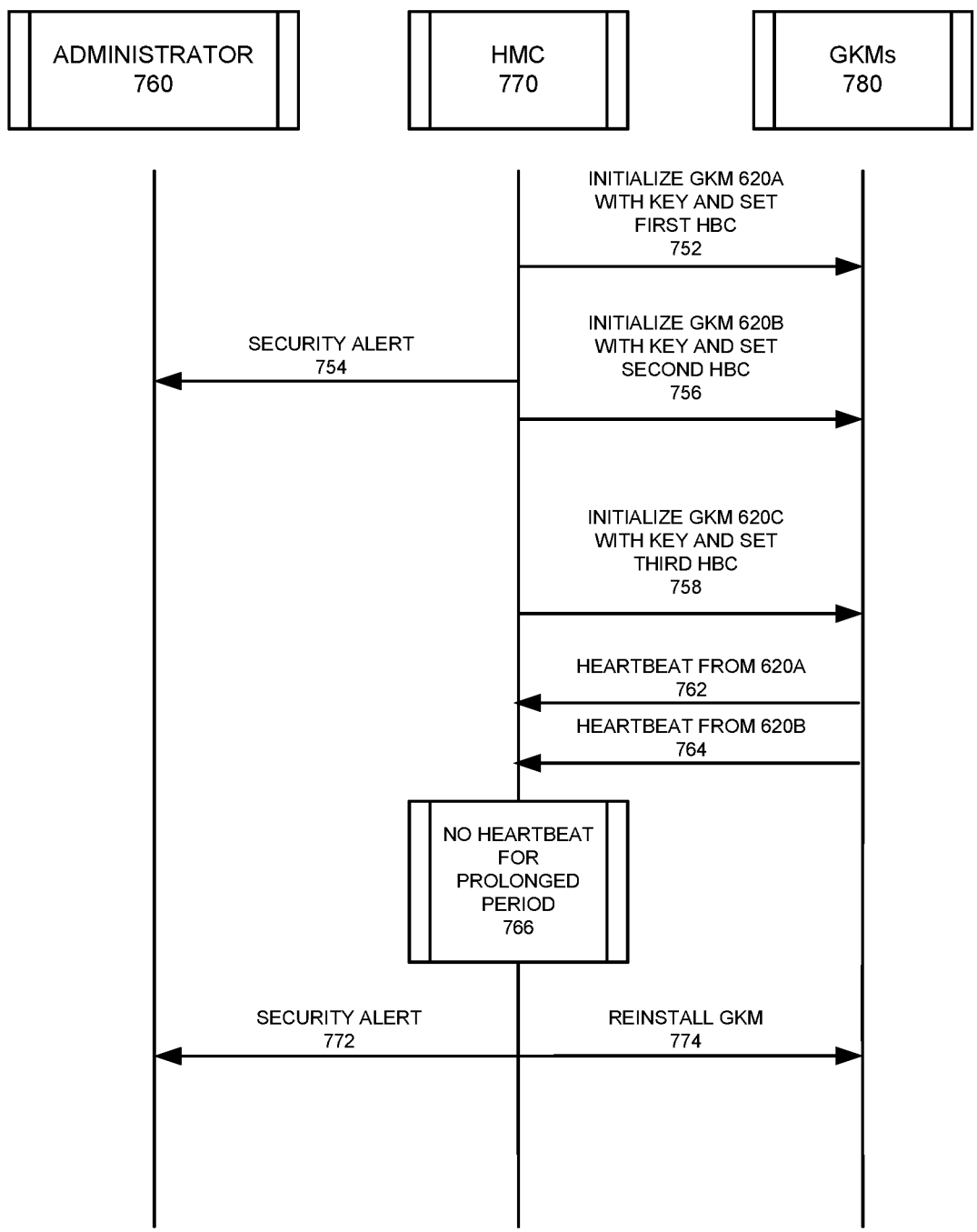
FIG. 7 illustrates a system communication diagram of a data communication between a plurality of guest operating systems and a hypervisor according to another example embodiment of the present application.

FIG. 7 illustrates a system communication diagram of a data communication between a plurality of guest operating systems and a hypervisor according to another example embodiment of the present application. Referring to FIG. 7, the example 700 includes the administrator 760 receiving any security alerts 758/777 from the HMC 770 of the hypervisor. The GKMs 780 represent a pool of GKMs being managed simultaneously. In operation, the HMC 770 may initialize a first GKM 620A with a particular key and set a first HBC requirement 752. Similarly, the second 620B and third 620C GKMs may be required to begin following a HBC requirement 756 and 758 customized for their security and the security of the virtual environment. A security alert 754 may be sent at any time to alert the administrator of the new GKM requirements and any potential threats identified. The heartbeat messages 762 and 768 may follow and the HBC may be checked in a profile for each GKM stored in the HMC 770 for compliance with the customized intervals to receive the heartbeat messages. When there is no heartbeat received for a prolonged period of time 766, for example, in this case, the third GKM 620C has failed to maintain its heartbeat period requirement, then the HMC 770 may attempt to create an alert and notify the administrator 760 via a security alert 772 and/or reinstall the GKM 774.

Figure 8:
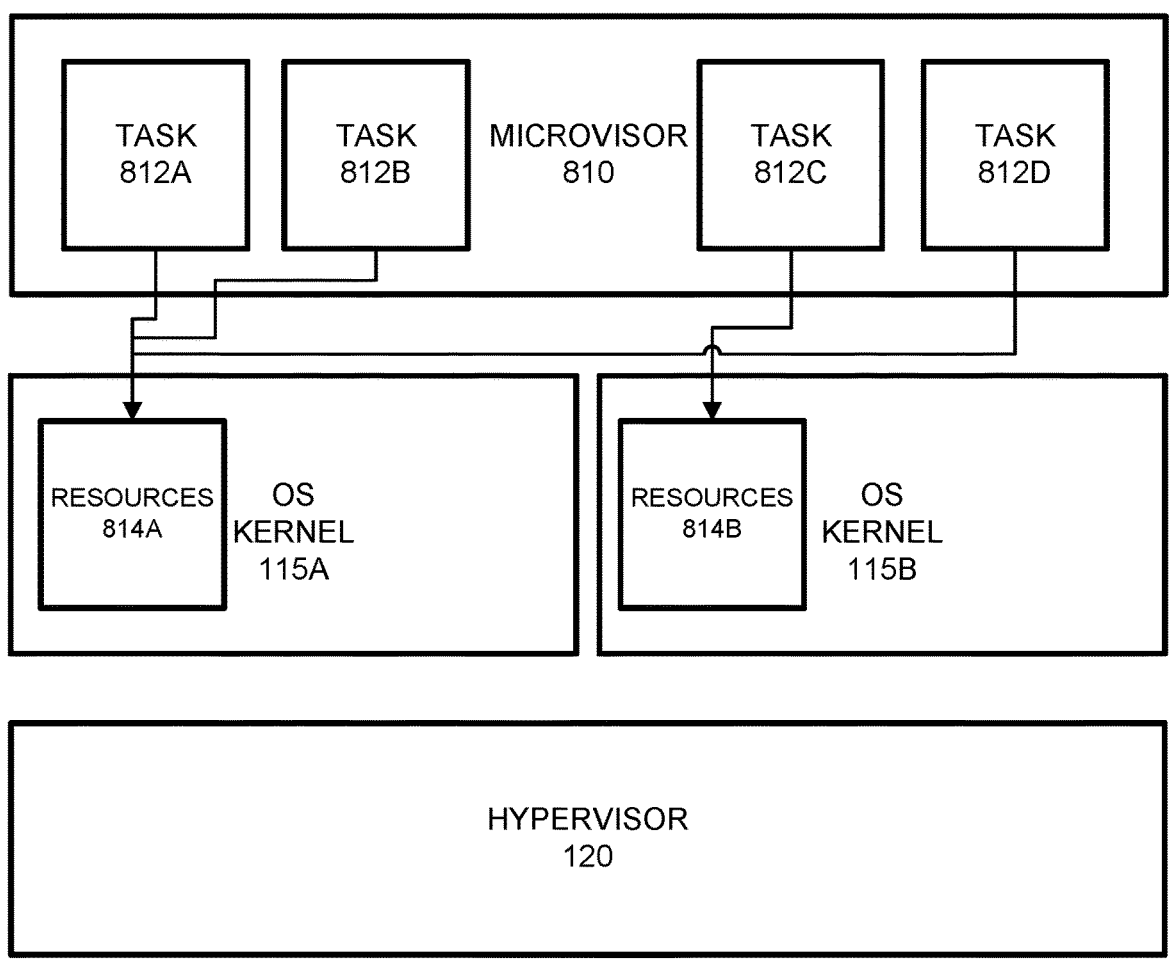
FIG. 8 illustrates a microvisor management configuration which operates with heartbeat messaging criteria according to example embodiments.

FIG. 8 illustrates a microvisor configuration for providing security to a virtual environment. Referring to FIG. 8, the microvisor 810 operates outside of the guest OS 115A and 115B. The microvisor 810 is setup to provide virtual instances to users in a virtual environment on a task-by-task basis 812A, 812B, 812C and 812D. In the virtual configuration, the tasks may be any application, such as a MICROSOFT OFFICE application, a .pdf document application, a web browser, an email application, etc. The task(s) is initiated and requires customized resources 814A and/or 814B from an operating system or kernel 115A/115B. Resources may include a network port/session to communicate with other entities, memory, CPU allocation, or any other resource associated with a virtual environment operating in the cloud.

Each task managed by the microvisor may be configured as a single micro virtual machine or micro-VM. The various micro-VMs may correspond to a single task and may provide a secure environment where a user may interact with the task in an isolated micro-VM workspace that communicates with a remote virtual operating system. A task includes all processing both within the application and within a kernel of the operating system that is required to offer resources necessary for the task to operate. For example, initiating a web browser or MICROSOFT OFFICE application tab or a PDF document can be considered an individual task.

This task separation and isolation format of the microvisor or micro-VMs provides protection from any attempted change or unauthorized access of information made by an outside party. For example, a micro-VM has limited access to protected information and the network in general which is likely not accessible at all beyond the use pattern of the application operating in the micro-VM. Also, a micro-VM may identify and log all information accessed and attempted to be accessed by the user to provide a details of a potential attacker including network traffic, file access attempts and changes that were attempted to be made by malware on the operating system or file system.

Figure 9:
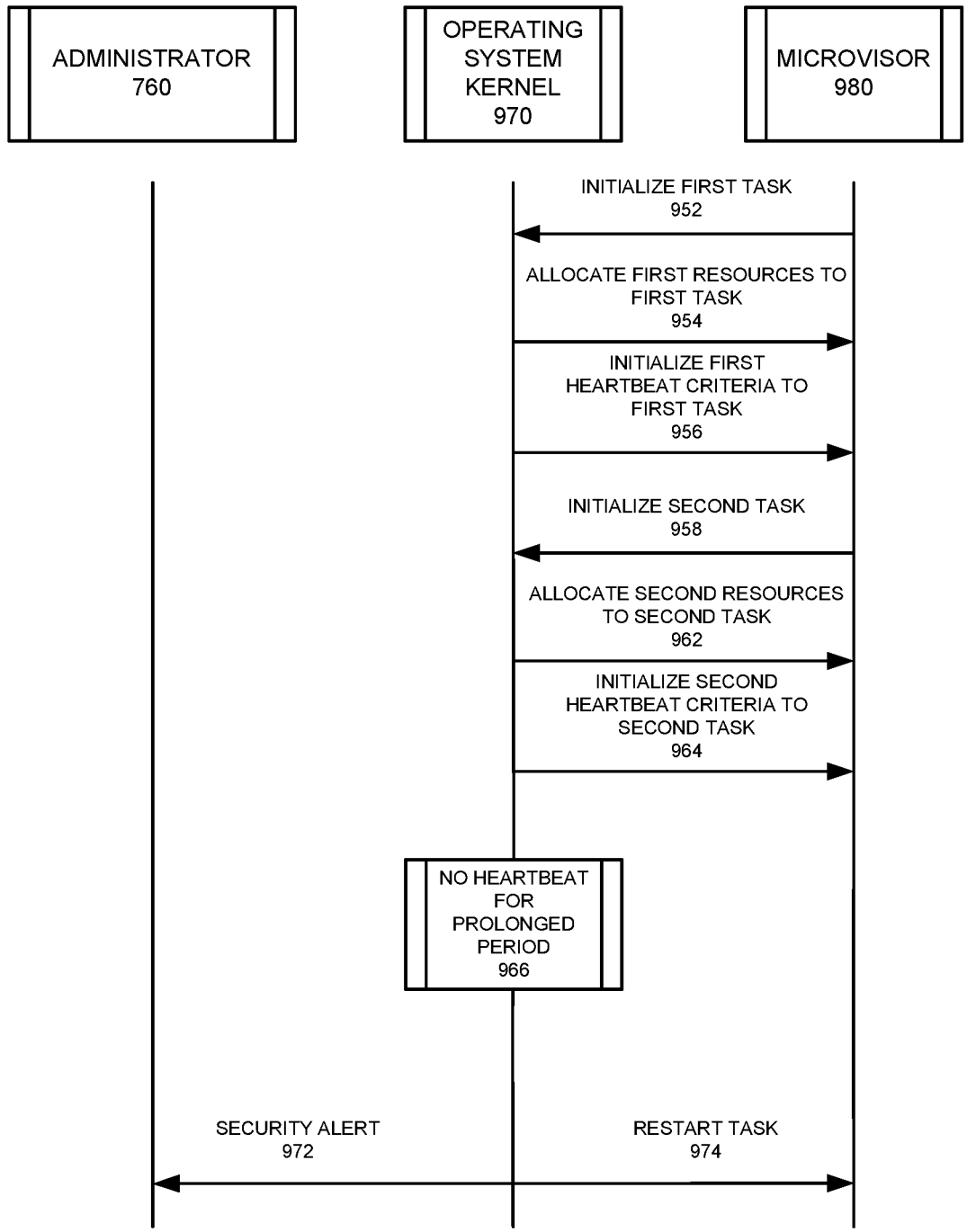
FIG. 9 illustrates a system signaling configuration of the microvisor configuration according to example embodiments.

FIG. 9 illustrates a system diagram that includes an operational scenario of the microvisor 980 being managed by the operating system/kernel for security purposes. Referring to FIG. 9, the administrator 760 may be a point of contact for any security alerts 972. However, the operating system 970 may manage the microvisor tasks by providing resources needed to perform the discrete tasks in exchange for a heartbeat protocol compliance measure. The task may be started and a micro-VM may initiate for the duration of the task use. For example, the microvisor 980 may initialize a first task 952, such as an application for word processing or a web browser. As a result, the operating system 970 may identify certain resources necessary for the first task to operate in the microvisor environment and allocate those resources 954 and require a first heartbeat criteria (i.e., frequency of heartbeats, etc.) 956 to be maintained by the task or else the resources will be vacated and the task will fail to operate.

In a further example of FIG. 9, a second task 958 may be spawned by the microvisor responsive to user criteria which requires additional resource allocation 962 for the second task and which will, in turn, require compliance with another heartbeat message criteria 964 as required by the operating system 970. In the event that there is no heartbeat received for a certain period of time (i.e., time allocated by the heartbeat criteria for task 1, task 2, etc.), then the process 966 will require an alert be created and sent to the administrator 760. Also, a task restart 974 may be performed to attempt to bring the task back to a compliance measure of the guest operating system. The lack of a heartbeat message after a predetermined period of time may equate to an application crash within the micro-VM instance. The remedies may include killing the micro-VM instance, restarting the application and reinstalling the micro-VM instance to initiate continued compliance with the micro-VM.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    injecting, by a management component of a hypervisor, a guest kernel module storing heartbeat protocol information and a secret key that is shared between the guest kernel module and the management component of the hypervisor into a kernel of a guest operating system during a boot-up of the guest operating system, wherein the injecting establishes an encrypted heartbeat communication channel between the kernel and the management component of the hypervisor while the guest operating system is booting; and
    receiving, at the management component of the hypervisor, periodic encrypted heartbeat messages from the injected guest kernel module based on the heartbeat protocol information, wherein each heartbeat, message verifies the injected guest kernel module is still operating.

2. The method of claim 1, further comprising maintaining a session between the management component of the hypervisor and the injected guest kernel module responsive to receiving the periodic encrypted heartbeat messages.

3. The method of claim 1, further comprising initializing a communication session between the injected guest kernel module and the management component of the hypervisor, wherein the management component is a hypervisor management component (HMC).

4. The method of claim 1, further comprising at least one of:
    determining that no periodic heartbeat messages have been received for a predetermined amount of time; and
    notifying an administrator device of a security alert in response to the determining.

5. The method of claim 4, further comprising attempting to reinstall the guest kernel module responsive to determining that no periodic heartbeat messages were received for the predetermined amount of time.

6. The method of claim 1, wherein the encrypted heartbeat messages are periodically transmitted from the injected guest kernel module to the management component of the hypervisor according to a predetermined time interval that is provided by installation of an agent application on the guest operating system.

7. The method of claim 6, further comprising at least one of:
    applying frequency criteria to the encrypted heartbeat messages; and
    monitoring whether the encrypted heartbeat messages are received according to the frequency criteria.

8. An apparatus, comprising:
    a processor configured to:
    inject, by a management component of a hypervisor, a guest kernel module storing heartbeat protocol information and a secret key that is shared between the guest kernel module and the management component of the hypervisor into a kernel of a guest operating system during a boot-up of the guest operating system, wherein the injection establishes an encrypted heartbeat communication channel between the kernel and the management component of the hypervisor component while the guest operating system is being booted; and
    receive periodic encrypted heartbeat messages from the injected guest kernel module based on the heartbeat protocol information, wherein each heartbeat message verifies the injected guest kernel module is still operating.

9. The apparatus of claim 8, wherein the processor is further configured to maintain a session between the management component of the hypervisor and the injected guest kernel module responsive to the periodic encrypted heartbeat messages being received.

10. The apparatus of claim 8, wherein the processor is further configured to initialize a communication session between the injected guest kernel module and the management component of the hypervisor, wherein the management component is a hypervisor management component (HMC).

11. The apparatus of claim 8, wherein the processor is further configured to determine that no periodic heartbeat messages have been received for a predetermined amount of time, and notify an administrator device of a security alert in response to the determination.

12. The apparatus of claim 11, wherein the processor is further configured to attempt to reinstall the guest kernel module responsive to the determination that no periodic heartbeat messages were received for the predetermined amount of time.

13. The apparatus of claim 8, wherein the encrypted heartbeat messages are periodically transmitted from the injected guest kernel module to the management component of the hypervisor according to a predetermined time interval that is provided by installation of an agent application on the guest operating system.

14. The apparatus of claim 13, wherein the processor is further configured to apply frequency criteria to the encrypted heartbeat messages, and monitor whether the encrypted heartbeat messages are received according to the frequency criteria.

15. A non-transitory computer readable storage medium configured to store instructions that when executed cause a processor to perform:
　　injecting, by a management component of a hypervisor, a guest kernel module storing heartbeat protocol information and a secret key that is shared between the guest kernel module and the management component of the hypervisor into a kernel of a guest operating system during a boot-up of the guest operating system, wherein the injecting establishes an encrypted heartbeat communication channel between the kernel and the management component of the hypervisor while the guest operating system is booting; and
　　receiving, at the management component of the hypervisor, periodic encrypted heartbeat messages from the injected guest kernel module based on the heartbeat protocol information, wherein each heartbeat message verifies the injected guest kernel module is still operating.

16. The non-transitory computer readable storage medium of claim 15, wherein the processor is further configured to perform maintaining a session between the management component of the hypervisor and the injected guest kernel module responsive to receiving the periodic encrypted heartbeat messages.

17. The non-transitory computer readable storage medium of claim 15, wherein the processor is further configured to perform initializing a communication session between the injected guest kernel module and the management component of the hypervisor, wherein the management component is a hypervisor management component (HMC).

18. The non-transitory computer readable storage medium of claim 15, wherein the processor is further configured to perform at least one of:
　　determining that no periodic heartbeat messages have been received for a predetermined amount of time; and
　　notifying an administrator device of a security alert in response to the determining.

19. The non-transitory computer readable storage medium of claim 18, wherein the processor is further configured to perform attempting to reinstall the guest kernel module responsive to determining that no periodic heartbeat messages were received for the predetermined amount of time.

20. The non-transitory computer readable storage medium of claim 15, wherein the encrypted heartbeat messages are periodically transmitted from the injected guest kernel module to the management component of the hypervisor according to a predetermined time interval that is provided by installation of an agent application on the guest operating system, and wherein frequency criteria is applied to the encrypted heartbeat messages, and used to monitor whether the encrypted heartbeat messages are received according to the frequency criteria.

21. The method of claim 1, wherein the injecting establishes the encrypted heartbeat communication channel between the kernel and a control module of the hypervisor that generates the shared secret key that is shared with the injected guest kernel module during installation of the guest kernel module.

22. The method of claim 1, wherein the heartbeat protocol information within the guest kernel module further includes heartbeat message specifications and a predefined transmission frequency of heartbeat messages.

* * * * *